(12) United States Patent
Kumar et al.

(10) Patent No.: US 9,571,402 B2
(45) Date of Patent: Feb. 14, 2017

(54) CONGESTION CONTROL AND QOS IN NOC BY REGULATING THE INJECTION TRAFFIC

(71) Applicant: NetSpeed Systems, San Jose, CA (US)

(72) Inventors: Sailesh Kumar, San Jose, CA (US); Eric Norige, East Lansing, MI (US)

(73) Assignee: NetSpeed Systems, San Jose, CA (US)

( * ) Notice: Subject to any disclaimer, the term of this patent is extended or adjusted under 35 U.S.C. 154(b) by 149 days.

(21) Appl. No.: 13/886,794

(22) Filed: May 3, 2013

(65) Prior Publication Data

US 2014/0328172 A1    Nov. 6, 2014

(51) Int. Cl.
*H04L 12/801* (2013.01)

(52) U.S. Cl.
CPC ..................................... *H04L 47/18* (2013.01)

(58) Field of Classification Search
None
See application file for complete search history.

(56) References Cited

U.S. PATENT DOCUMENTS

| | | | |
|---|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

International Search Report and Written Opinion for PCT/US2013/064140, Jan. 22, 2014, 9 pgs.

(Continued)

*Primary Examiner* — Ayaz Sheikh
*Assistant Examiner* — Peter Chau
(74) *Attorney, Agent, or Firm* — Procopio, Cory, Hargreaves & Savitch LLP

(57) ABSTRACT

Systems and methods described herein are directed to solutions for NoC interconnects that provide congestion avoidance and end-to-end uniform and weighted-fair allocation of resource bandwidths among various contenders in a mesh or torus interconnect. The example implementations are fully distributed and involve using explicit congestion notification messages or local congestion identification for congestion detection. Based on the congestion level detected, the injection rates of traffic at various agents are regulated that avoids congestion and also provides end-to-end QoS. Alternative example implementations may also utilize end-to-end credit based flow control between communicating agents for resource and bandwidth allocation of the destination between the contending sources. The resource allocation is performed so that both the weighted and strict bandwidth allocation QoS policies are satisfied.

12 Claims, 17 Drawing Sheets

(56) References Cited

U.S. PATENT DOCUMENTS

| | | | |
|---|---|---|---|
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,619,622 B2* | 12/2013 | Harrand et al. | 370/253 |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0041889 A1* | 2/2006 | Radulescu et al. | 719/313 |
| 2006/0161875 A1 | 7/2006 | Rhee | |
| 2007/0118320 A1 | 5/2007 | Luo et al. | |
| 2007/0195748 A1* | 8/2007 | Radulescu | H04L 45/00 370/351 |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2007/0274331 A1* | 11/2007 | Locatelli et al. | 370/402 |
| 2008/0072182 A1 | 3/2008 | He et al. | |
| 2008/0120129 A1 | 5/2008 | Seubert et al. | |
| 2008/0186991 A1* | 8/2008 | Thid et al. | 370/419 |
| 2008/0186998 A1* | 8/2008 | Rijpkema | 370/458 |
| 2008/0211538 A1* | 9/2008 | Lajolo et al. | 326/38 |
| 2008/0232387 A1* | 9/2008 | Rijpkema | H04L 45/00 370/420 |
| 2008/0267211 A1* | 10/2008 | Gangwal | H04Q 11/04 370/458 |
| 2008/0310458 A1* | 12/2008 | Rijpkema | H04L 45/00 370/498 |
| 2009/0070726 A1 | 3/2009 | Mehrotra et al. | |
| 2009/0122703 A1* | 5/2009 | Gangwal et al. | 370/235 |
| 2009/0268677 A1 | 10/2009 | Chou et al. | |
| 2009/0285222 A1* | 11/2009 | Hoover et al. | 370/397 |
| 2009/0313592 A1 | 12/2009 | Murali et al. | |
| 2010/0040162 A1 | 2/2010 | Suehiro | |
| 2010/0281144 A1* | 11/2010 | Mangano et al. | 709/221 |
| 2011/0035523 A1 | 2/2011 | Feero et al. | |
| 2011/0060831 A1 | 3/2011 | Ishii et al. | |
| 2011/0069612 A1* | 3/2011 | Yamaguchi | H04L 45/12 370/225 |
| 2011/0072407 A1 | 3/2011 | Keinert et al. | |
| 2011/0085550 A1* | 4/2011 | Lecler et al. | 370/392 |
| 2011/0154282 A1 | 6/2011 | Chang et al. | |
| 2011/0276937 A1 | 11/2011 | Waller | |
| 2011/0302345 A1* | 12/2011 | Boucard et al. | 710/123 |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0079147 A1* | 3/2012 | Ishii et al. | 710/107 |
| 2012/0110541 A1 | 5/2012 | Ge et al. | |
| 2012/0155250 A1 | 6/2012 | Carney et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0142066 A1* | 6/2013 | Yamaguchi et al. | 370/252 |
| 2013/0151215 A1 | 6/2013 | Mustapha | |
| 2013/0159944 A1 | 6/2013 | Uno et al. | |
| 2013/0163615 A1* | 6/2013 | Mangano et al. | 370/468 |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0250792 A1* | 9/2013 | Yoshida et al. | 370/252 |
| 2013/0263068 A1 | 10/2013 | Cho et al. | |
| 2013/0268990 A1* | 10/2013 | Urzi et al. | 725/119 |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0112149 A1* | 4/2014 | Urzi et al. | 370/236 |
| 2014/0115218 A1 | 4/2014 | Philip et al. | |
| 2014/0115298 A1 | 4/2014 | Philip et al. | |
| 2014/0204740 A1* | 7/2014 | Tokutsu et al. | 370/230 |

OTHER PUBLICATIONS

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NoCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

Das, R., et al., "Aergia: Exploiting Packet Latency Slack in On-Chip Networks", ISCA, Jun. 2010.

Abts, D et al., "Age-Based Packet Arbitration in Large-Radix k-ary n-cubes", SC07, Nov. 2007.

Lee, M et al., "Approximating Age-Based Arbitration in On-Chip Networks", PACT, Sep. 2010.

Li, B et al., "CoQoS: Coordinating QoS-aware shared resources in NoC-based SoCS", J. Parallel Distrib. Comput, Oct. 2010.

Ebrahimi, E, et al., "Fairness via Source Throttling: A Configurable and High-Performance Fairness Substrate for Multi-Core Memory Systems", ASPLOS, Mar. 2010.

Lee, J. et al., Globally-Synchronized Frames for Guaranteed Quality-of-Service in On-Chip Networks, ISCA, Jun. 2008.

Grot, B. et al., "Kilo-NoC: A Heterogeneous Network-on-Chip Architecture for Scalability and Service Guarantees", ISCA, Jun. 2011.

Jiang, N. et al., "Performance Implications of Age-Based Allocation in On-Chip-Networks", CVA MEMO 129, May 2011.

Grot, B. et al., Preemptive Virtual Clock: A Flexible, Efficient, and Cost-effective QoS Scheme for Networks-on-Chip, MICRO'09, Dec. 2009.

Grot, B. et al., Topology-aware Quality-of-Service Support in Highly Integrated Chip Multiprocessors, 6th Annual Workshop on the Interaction between Operating Systems and Computer Architecture, Jun. 2010.

\* cited by examiner

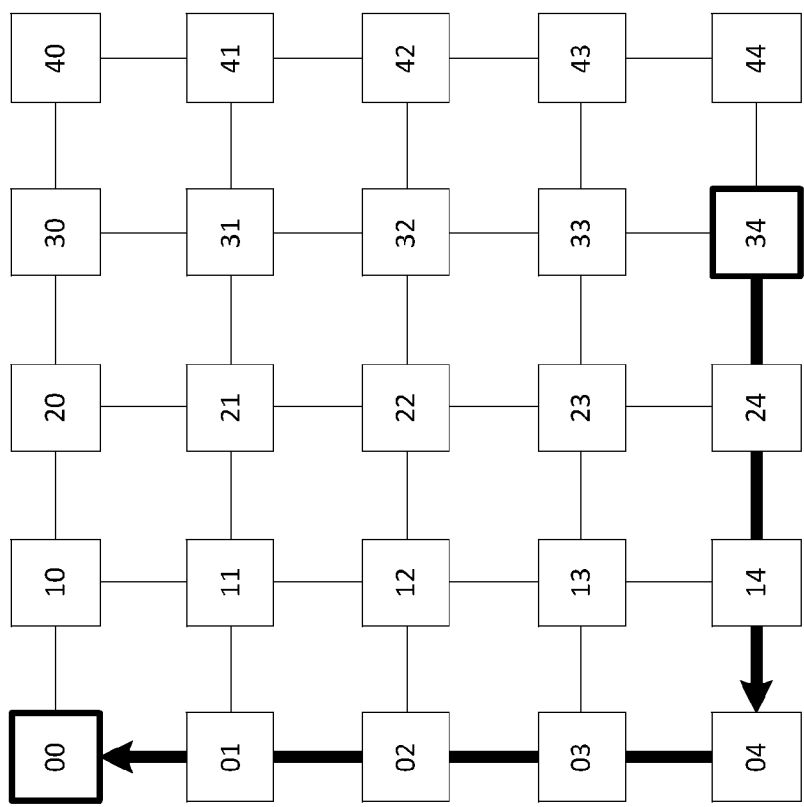

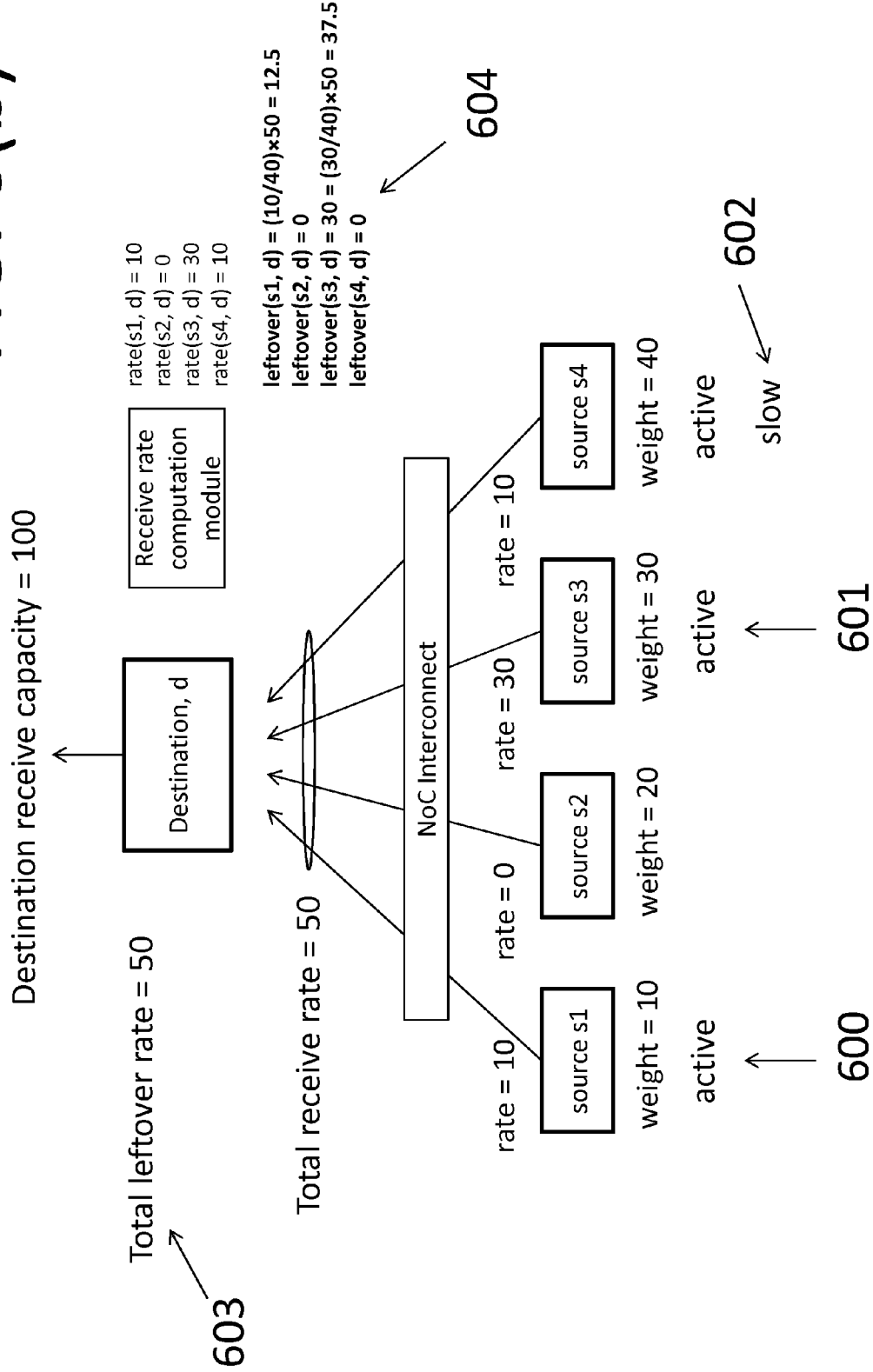

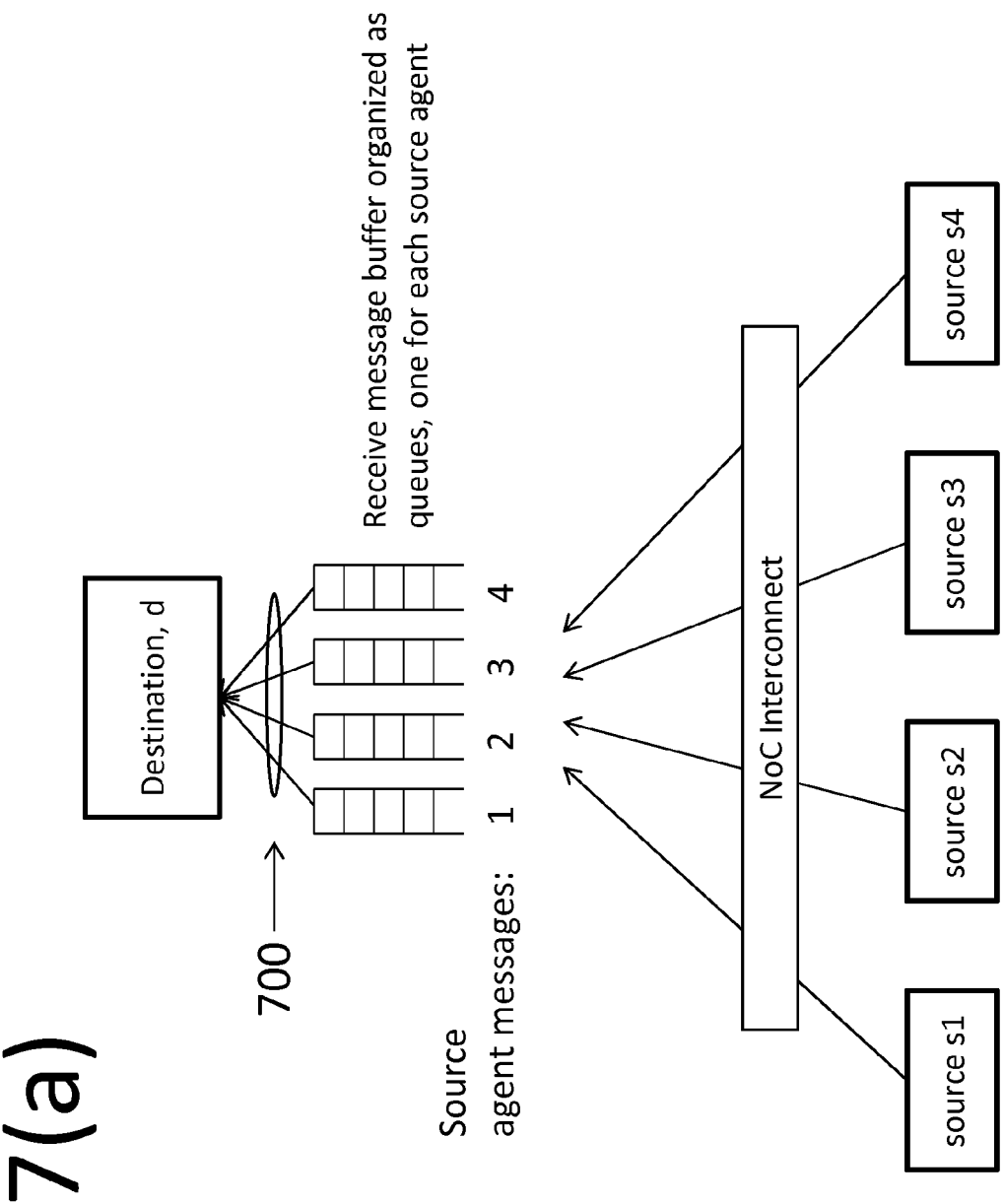

Common buffer pool at destination dynamically allocated

Separate buffer pool at destination for each source

Common buffer pool at destination dynamically allocated with support for message discard and retransmission Optimized design with one few message for credit request

CONGESTION CONTROL AND QOS IN NOC BY REGULATING THE INJECTION TRAFFIC

BACKGROUND

Technical Field

Methods and example implementations described herein are generally directed to interconnect architecture, and more specifically, to weight assignment and weighted arbitration of node channels in a Network on Chip (NoC) system interconnect architecture.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIGS. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to the router in the higher layer, and another connecting to the router in the lower layer. Router 111 in the middle layer of the example has both ports used one connecting to the router at the top layer and another connecting to the router at the bottom layer. Routers 110 and 112 are at the bottom and top mesh layers respectively, therefore they have only the upper facing and lower facing ports of the two additional ports used. The inter-layer ports or channels between these three routers are 113 and 114.

Packets are message transport units for intercommunication between various components. Routing involves identifying a path composed of a set of routers and physical links of the network over which packets are sent from a source to a destination. Components are connected to one or multiple ports of one or multiple routers, with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may be implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing is often minimal turn and shortest path routing.

FIG. 2 pictorially illustrates an example of XY routing in a two dimensional mesh. More specifically, FIG. 2 illustrates XY routing from node '34' to node '00'. In the example of FIG. 2, each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. During congestion, when multiple sources transmit messages to the same destination, their messages may contend with each other and with the cross-traffic for the bandwidth. Therefore, the effective destination bandwidth received by each source will depend on their positions in the network, how their routes overlap with each other, cross-traffic along their routes to the destination, and the arbitration policies deployed at various routers where arbitration is needed. In spite of uniformly fair arbitration policies at all routers, depending on location of various sources there may be a substantial difference in the destination bandwidth received.

Consider a section of a NoC interconnect shown in FIG. 3, wherein four components (source 1, source 2, source 3, and source 4) transmit messages to one component (destination). In this example, the maximum data transmit bandwidth of the four source components is equal to the maximum data receive bandwidth of the destination component. Each of the five components are connected to a local router node, and the router nodes are connected with each other using point to point channels as shown in FIG. 3. In the example of FIG. 3, each of the channels have a receive bandwidth of the destination component equal to a transmit bandwidth of the source component.

In the system shown in FIG. 3, if all four source components attempt to transmit data at their peak transmit rate and if the destination component is ready to accept data at its peak receive rate, then messages from the four source components will contend with each other within the NoC interconnect.

In FIG. 4, the routers and components are separated for clarity, and the channels that connect components with their local routers are illustrated.

At router 41 in FIG. 4, messages arriving at the left input port (e.g., from router 42) and the bottom input port (e.g., from source 4) will contend for the right output port (e.g., to router 40). If routers implement uniformly fair arbitration policy to arbitrate between incoming messages at different input ports contending for an output port, then the output port's bandwidth will be equally split between the two input ports as shown. Each input port will receive 50% of the destination bandwidth—source 4 therefore will receive half of the destination bandwidth.

At router 42 in FIG. 4, messages arriving at the left input port (e.g. from router 43) and bottom input port (e.g., from source 3) will contend for the right output port. If routers implement uniformly fair arbitration policy to arbitrate between incoming messages at different input ports contending for an output port, then the 50% output port's bandwidth (computed in the above step) will be equally split between the two input ports as shown. Each input port will receive 25% of the destination bandwidth—source 3 therefore will receive a quarter of the destination bandwidth.

At router 43 in FIG. 4, messages arriving at the left input port (e.g., from router 44) and bottom input port (e.g., from source 2) will contend for the right output port (e.g., to router 42). If routers implement uniformly fair arbitration policy to arbitrate between incoming messages at different input ports contending for an output port, then the 25% output port's bandwidth (computed in the above step) will be equally split between the two input ports as shown. Each input port will receive 12.5% of the destination bandwidth—source 2 therefore will receive 12.5% of the destination bandwidth. The remaining 12.5% bandwidth will be received by source 1.

The example of FIG. 4 illustrates that even though each router employs a uniformly fair arbitration policy wherein the router gives fair share of output port bandwidth among all input port contenders, the four sources receive vastly different shares of the destination bandwidth. In a complex network with additional cross-traffic, the bandwidth allocated to various source components when they content for various destinations may vary substantially. This may be undesirable in many applications, wherein fair or equal allocation of various resources among all contenders may be important to achieve a high system performance. In many systems, weighted allocation is desired, so that the various resource bandwidths are allocated among various contenders in a pre-specified ratio.

There are several techniques in the related art to provide uniform or weighted fair arbitration within a single router, wherein the output port bandwidth is allocated to contending input ports based on the weight specification. Weighted round-robin, deficit round-robin, weighted fair queuing, etc. are a few techniques that are used in the related art. Guaranteeing weighted or uniform allocation of various resources among contenders in a distributed NoC interconnect with resources and contenders connected at arbitrary positions in the NoC interconnect is challenging. A few techniques that are used in the related art are described below.

Rate limiting the sources: Each source contending for a resource destination is allowed to send data at a pre-specified rate based on its fair share. This technique is independent of the state of other sources, whether the other sources are contending for the resource or not. Therefore, based upon the pre-specified rates of sources, rate limiting of the sources can either lead to under-utilization of resource bandwidth, or unfair allocation.

Age based arbitration: Every message injected by various components carries timestamp information, which describes the age of the message. Within the NoC interconnect, routers give higher preference to older messages over newer messages, whenever multiple messages content for an output port. This technique can provide end-to-end uniform fairness, however it is unable to provide weighted fairness. Furthermore, age based arbitration comes at a high implementation cost of additional bits needed to carry the age information and complex circuitry at every router to determine the oldest message.

Weight based arbitration: Weights for various channels in a network on chip (NoC) is computed based on the bandwidth requirements of the traffic flows at the channels. Subsequently these weights are used to perform weighted arbitration between channels at each router in the NoC to provide Quality of Service (QoS). Advanced implementations may dynamically adjust the weights by monitoring the activity of flows at the channels to avoid unfair allocations, and perform weighted arbitration using the newly computed channel weights. This is described in U.S. application Ser. No. 13/745,696, herein incorporated by reference in its entirety for all purposes. Using this scheme, an example assignment of weights to various channels of the NoC illustrated in FIG. 4 is shown in FIG. 5. There are four flows from four sources which are contending for the destination's bandwidth. Assume that each flow needs to share the bandwidth equally. At node 40, the bandwidth at the incoming channel and the outgoing channel is same, therefore after normalization their weights are 1. At node 41, the bandwidth requirement of the incoming channel from left is three times the bandwidth requirement of the incoming channel at the bottom, as there are three flows being carried on the former channel versus only one flow at the latter. Therefore the weights are 3 and 1 respectively. Similarly, weights of the left and bottom incoming channels at node 42 are 2 and 1 respectively and at node 43 are 1 and 1 respectively. With this weight assignment, if weighted arbitration is performed at all nodes then fair allocation of destination bandwidth may be provided to all sources. If certain sources are inactive and are not participating in the arbitration then this weighted scheme may become unfair. For example if source 2 and source 3 are not participating then, source 1 may receive three-fold higher bandwidth than source 1.

SUMMARY

Aspects of the present application include a method, which may involve providing congestion avoidance and end-to-end flow control and QoS by using explicit notification messages between communicating agents for congestion notification; using the congestion notification information to adjust and regulate the transmission rates at various agents; computing the transmission rates and enforcing them at the agents, or alternatively using various types of end-to-end flow credit based flow control schemes for controlling the resource allocation to various agents.

Aspects of the present application include a computer readable storage medium storing instructions for executing a process. The process may involve providing congestion avoidance and end-to-end flow control and QoS by using explicit notification messages between communicating agents for congestion notification; using the congestion notification information to adjust and regulate the transmission rates at various agents; computing the transmission rates and enforcing them at the agents, or alternatively using various types of end-to-end flow credit based flow control schemes for controlling the resource allocation to various agents.

Aspects of the present application include a system or apparatus, which may involve providing congestion avoidance and end-to-end flow control and QoS by using explicit notification messages between communicating agents for congestion notification; using the congestion notification information to adjust and regulate the transmission rates at various agents; computing the transmission rates and enforcing them at the agents, or alternatively using various types of end-to-end flow credit based flow control schemes for controlling the resource allocation to various agents.

Aspects of the present application may involve a NoC which may be configured at the NoC level to provide congestion avoidance and end-to-end flow control and QoS by use of explicit notification messages between communicating agents for congestion notification; use the congestion notification information to adjust and regulate the transmission rates at various agents; compute the transmission rates and enforce them at the agents, or alternatively use various types of end-to-end flow credit based flow control schemes to control the resource allocation to various agents.

BRIEF DESCRIPTION OF THE DRAWINGS

FIG. 2 illustrates an example of XY routing in a related art two dimensional mesh.

FIG. 6(b) illustrates the resulting rate computed by the rate computation module, total leftover bandwidth and the way leftover bandwidths are assigned to the source agents, in accordance with an example implementation.

FIG. 7(a) illustrates a system with four source and one destination agents and end-to-end credit based flow control scheme using separate buffers at the destination for each source agents, in accordance with an example implementation.

DETAILED DESCRIPTION

Figure 1A:
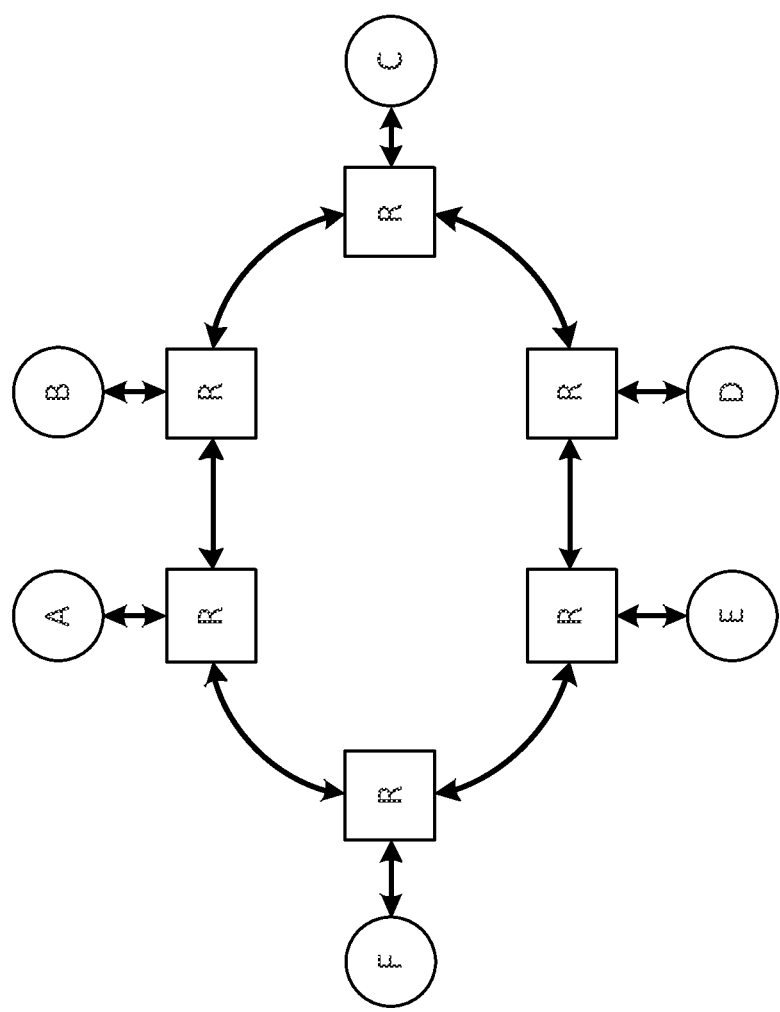
FIGS. 1(a), 1(b) 1(c) and 1(d) illustrate examples of Bidirectional ring, 2D Mesh, 2D Torus, and 3D Mesh NoC Topologies.
Figure 1B:
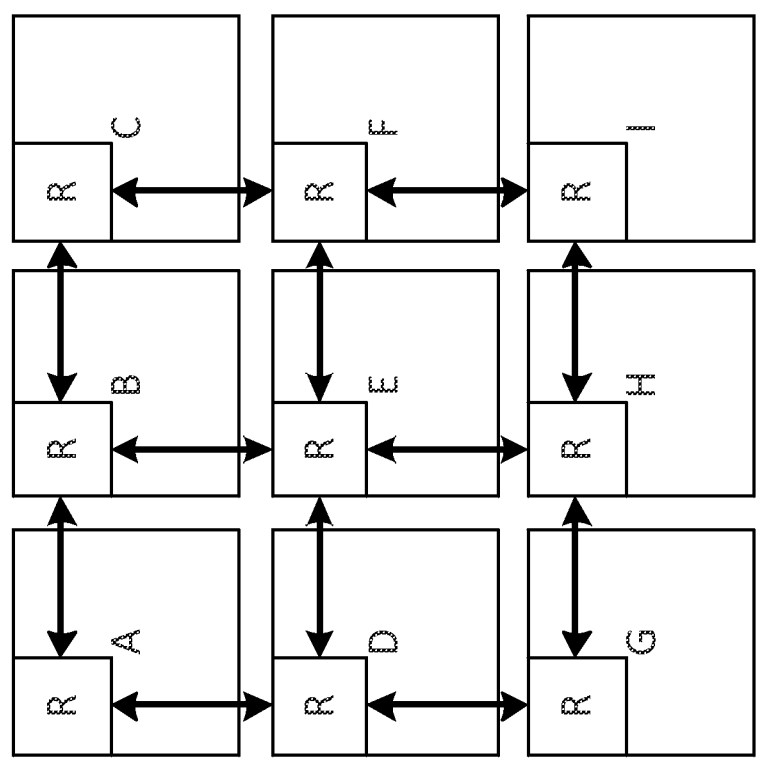
Figure 1C:
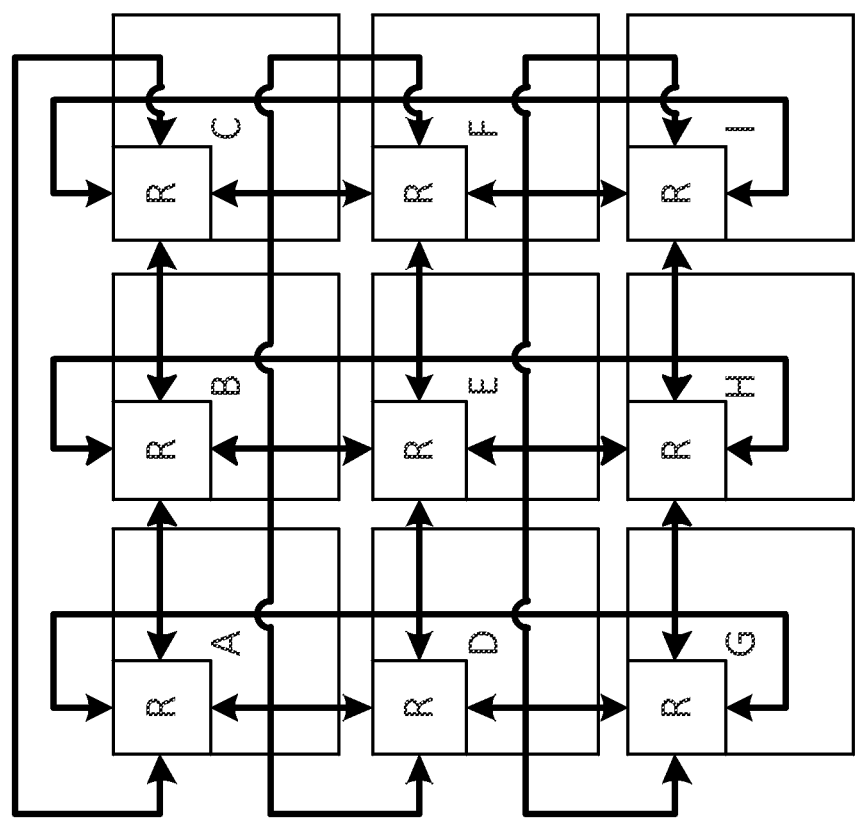
Figure 1D:
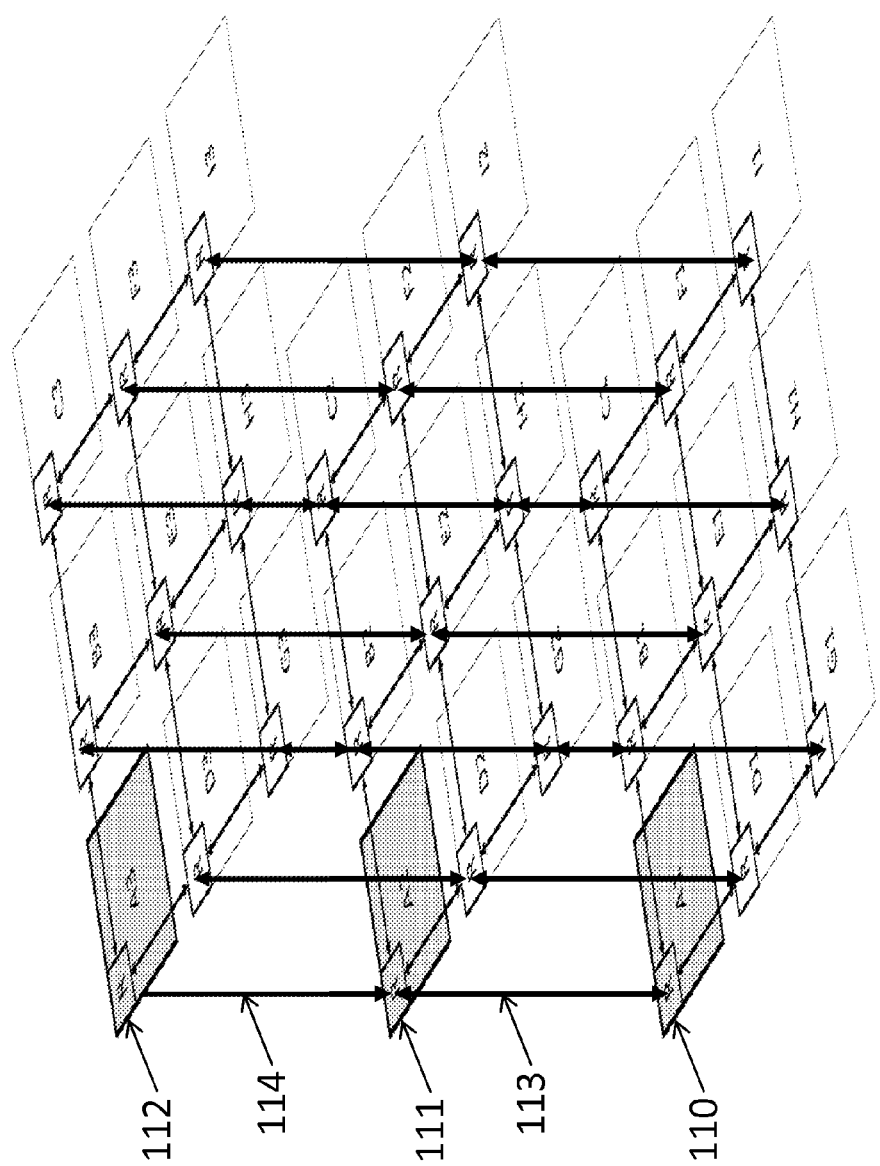
Figure 3:
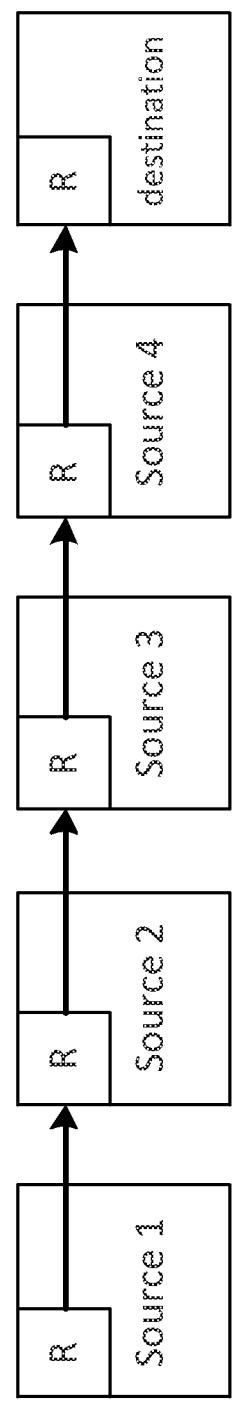
FIG. 3 illustrates an example of a NoC interconnect.
Figure 4:
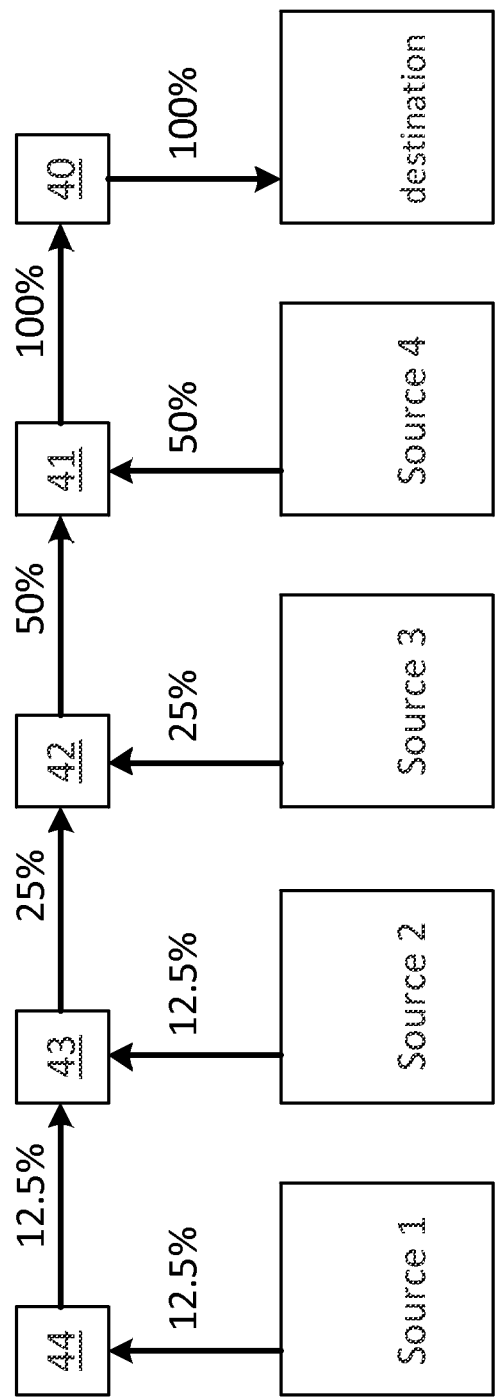
FIG. 4 illustrates a NoC interconnect with routers and interconnects separated for clarity and bandwidth received by various channels.
Figure 5:
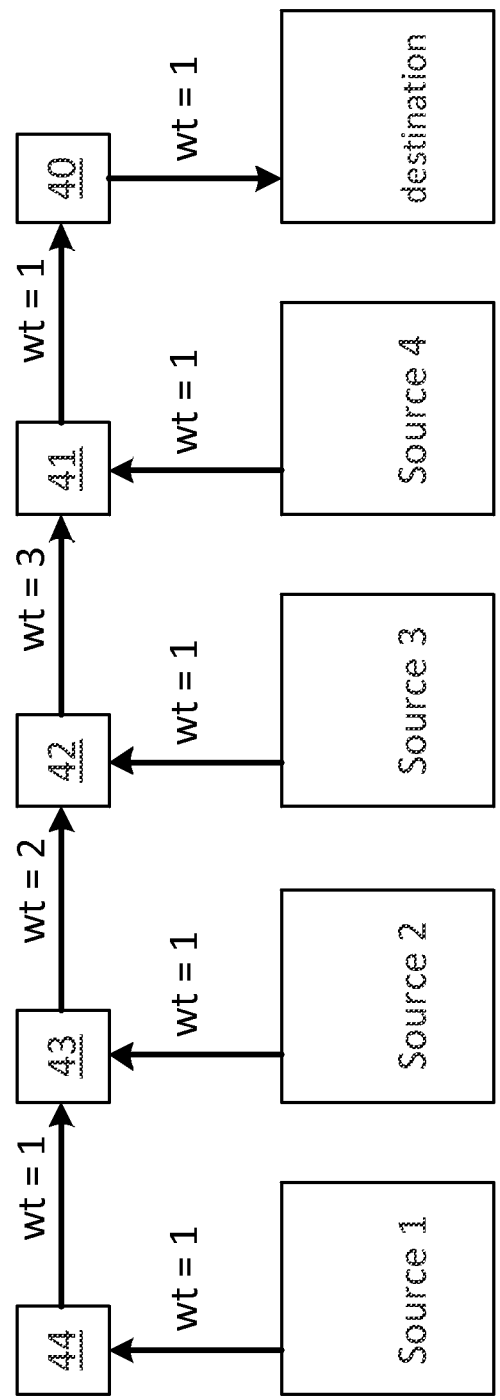
FIG. 5 illustrates an example assignment of weights to various NoC channels, in accordance with an example implementation.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations of the present application involve regulating the way various agents connected to the NoC inject traffic into the NoC so that the network congestion can be avoided and provide fairness and maintain QoS. Certain implementations of such traffic injection regulation schemes may have been employed in the Internet traffic management, but not in the NoC interconnects with 2-D, 2.5-D or 3-D mesh or Torus topologies. There are a number of challenges in implementing injection regulation in the NoC interconnects to avoid congestion. The first is due to the delayed congestion detection. The injection rate regulation at sources can be enforced after congestion is detected in the network, which often occurs after certain delay from the moment congestion actually occurs. For example, if an explicit congestion notification is sent by the destination agent to sources or congestion is computed by the sources based on the detected round-trip latency, then there will be a round trip time delay from the moment congestion occurs to the moment source agents are notified. This time gap may cause oscillations in the network congestion and destination's bandwidth utilization.

By the time the sources take action, there may already be excessive congestion, which in turn may prompt the sources to overreact, which may thereby result in underutilization. The "slow start" congestion strategy, in which source agents slowly (i.e. cautiously) increase their transmission rates, has been employed in the Internet to avoid such oscillations. However, the slow start congestion strategy works only when the transmitting agents are sending steadily and their burstiness is much smaller than the round-trip latency in the network. In on-chip networks and SoCs, the agent's traffic behavior may be highly bursty, and maintaining low latency and high resource utilization may be more important. Therefore, such standard techniques may not work very well in an SoC or NoC.

Standard congestion control techniques that regulate the traffic injection rate may also cause unfairness in the resource bandwidth allocation among various contenders in the system adversely affecting the QoS. Example implementations described herein are directed to solutions for 2-D, 2.5-D and 3-D NoC interconnects that avoids network congestion by regulating the injection of traffic at various source agents and provides end-to-end uniform-fair and weighted-fair allocation of destination bandwidth among the contending source agents. A number of novel traffic injection regulation designs are described. The example implementations are fully distributed and scales well with number of agents in the NoC interconnect.

To control congestion and regulate the traffic injection, congestion must be detected first. The congestion detection is described below with three example methods, which can be used individually or together with each other in a system. In the first method, the destination agents which are receiving messages from various sources send an explicit notification back to the corresponding sources indicating whether it is congested or not (i.e. it is receiving messages at rate higher than it can process therefore it has a backlog). If the destination is congested then the sources should back-off and slow down their transmission rate. The notification may be piggybacked if the destination sends a response message back to the sources, or the notification can be a separate message sent on the same NoC or on a separate set of side band channels. Based on the congestion notification, sources regulate the traffic injection.

In the second method, the sources (transmitting agents) compute the level of congestion in the system interconnect by monitoring various metrics, such as the round-trip time of the request to response messages if applicable, or the amount of backpressure the source is experiencing from the network when the source attempts to inject a message to a destination. Based on this information, the sources take action locally to avoid the congestion and ensure QoS.

In the third method, the destination agents use buffers or allocate credit for buffer slots to various sources to control the message arrival from various sources. Buffers or credits may be allocated among all contending source agents based on the QoS policy. If a source does not have an allocated buffer or credit for the destination, it may not send to the destination. Buffers or credits for a destination can be pre-allocated among the sources or can be allocated by the destination upon receiving an explicit request from a source. This method may provide end-to-end flow control in the system and congestion avoidance and QoS policy may be enforced with the correct allocation of buffers and credit distribution. These three example methods are described in greater detail in next section.

The first method uses explicit congestion notification messages. An explicit congestion notification message from a destination agent may contain information such as the current load at the destination agent, the acceptable load that the agent can handle from the source, etc. When the notification information from a destination agent is available at a source, the source may begin to regulate the injection rate of messages for the destination based on the notification information. The explicit notification information may include the rate at which the sources are allowed to transmit to the destination, in which case sources can regulate the traffic to the destination with this rate. In an alternative design, the notification may only indicate the congestion state at the destination to the sources communicating with the destination; the congestion state may be a bit indicating whether there is congestion at the destination or not or can also indicate the amount of congestion. Based on this information, sources may locally determine the transmission rate to the destination.

If the notification information contains the rate at which various sources may transmit to various destinations, the destination computes the rate at which various sources may transmit messages to the destination. To compute this rate, the destinations may use information such as the average and peak transmission rates of various source agents when communicating with the destination, and the relative weight between them, in addition to the current level of congestion at the destination.

Let $rp(i, j)$ and $ra(i, j)$ be the peak and average transmission rate of messages respectively from source agent i to destination agent j. Let $w(i, j)$ be the weight of messages from source agent i to destination agent j. The weight decides how messages from a source are serviced.

For example if two sources, a and b, transmits messages to a destination c and are transmitting faster than destination can accept, then the ratio of the number of messages from the two sources that gets serviced is the ratio of their weights, i.e. $w(a, c)/w(b, c)$. This is referred to as fair allocation and every source agent gets their fair share of bandwidth.

However, if a source is sending fewer messages than its fair share, then the remaining bandwidth may be utilized by the sources which are willing to send more than their fair-share of bandwidth. This is called the work-conserving property. A work-conserving design may ensure that fair allocation of bandwidth occurs between contending sources and the remaining leftover bandwidth (if any) is distributed between the remaining sources based on their weights to fully use the system bandwidth.

The example implementation can be fair as well as work-conserving. Every destination keeps track of the rate at which it is receiving messages. The destination is congested by x % if it is receiving messages at x % higher rate than the rate it can process them. For all source agents that communicate with the destination, the destination tracks whether they are currently transmitting or not. If n source agents are currently transmitting indicated by the set {active} then the fair rate at which the source agent s may send messages to destination d is:

$$\text{rate}(s,d) = w(s,d)/\Sigma_{\{active\}} w(k,d) \times \text{receive rate of } d \quad (1)$$

This rate in equation (1) is notified by the destination agent d to the sources and they limit their transmission rate to the destination to this value. Notice that some source agents may be sending at a rate lower than their fair share, in which case the destination will receive traffic from the source at a rate lower than it has allocated to the source. To detect this and maintain work-conserving property, the rate at which destination d is receiving messages from each source is tracked. This tracking may be implemented at the destination, with a counter for each source. The destination can then increment the corresponding counter whenever a message arrives from a source, and then track the rate at which various counters are increasing.

Once the receive rate from all sources are known at the destination, the destination can detect sources that are sending at a rate lower than their fair share, wherein the remaining bandwidth of the destination can be re-distributed among the remaining active sources. Let sources that are sending less than their fair share of traffic be indicated by the set {slow}, then the leftover bandwidth of the destination is distributed among the agents in the set {active}-{slow} according to the following equation:

$$\text{leftover}(s,d) = w(s,d)/\Sigma_{\{active\}-\{slow\}} w(k,d) \times \text{leftover bandwidth of } d \quad (2)$$

The adjusted rate of a source agent s in the set {active}-{slow} is now its previously computed rate, rate(s, d)+its share of the leftover bandwidth, leftover(s, d). The updated transmission rate is notified to the sources in the set {active}-{slow} with new notification messages.

At some point, the destination may start to receive enough traffic or the destination may detect that there are no source agents left in the set {active}-{slow}. In both cases, the maximum utilization state is achieved and no new additional notification to adjust the source agent's rate need to be sent.

The destination may get congested when new source agents become active and begin transmitting or existing active agents decide to increase their transmission rates. When a destination agent detects congestion by x % (message receive rate exceeds the destination processing capacity by x %), the destination agent readjusts the transmission rate of the active sources and sends new notification messages to enforce the adjusted rates at the sources so that the total receive traffic at the destination is reduced by x %. The fair share transmission rate of all active agents is re-computed based on the current transmission rate of all active source agents, and their computed fair share.

The source agents that are already sending at rates lower than their new fair share do not need to reduce their transmission rates, and do not need to be notified again. Only those agents which are sending more than their new fair share of bandwidth need to be notified to reduce their rates. Once the source agents are notified to reduce their rates, they will slow down and the congestion should disappear.

Since no agents are active right after reset or in the beginning, the source agents need to be provided with a rate at which they begin transmitting when they become active. An example implementation may use a fixed initial rate at which any given inactive agent begins transmitting, or may begin at their fair share of rate when all agents are active (this value will be proportional to the weight of the agents and cumulative rate will be equal to the destination's receive capacity). When an agent become active again after being inactive for some time, an example implementation may use the initial rates, or the last transmission rate of the agent when it was active last. Other initial rate values which are either higher or lower than the fair share rates may be used to improve the utilization of the system when agents go from inactive to active states.

Figure 6A:
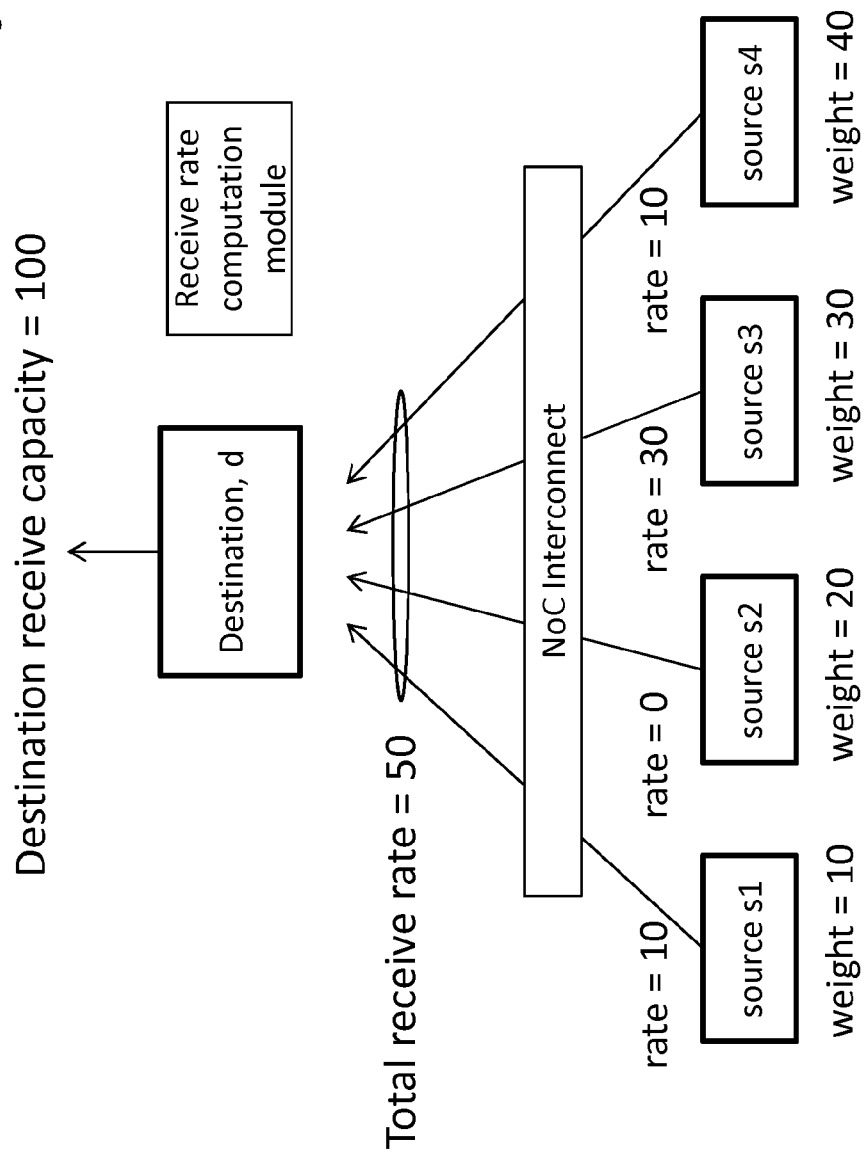
FIG. 6(a) illustrates a system with four source agents communicating with a destination agent and the weight and the transmission rates of the source agents, in accordance with an example implementation.

Consider the following example that illustrates this type of explicit notification based rate regulation. In FIG. 6(a), there is a destination d to which four source agents, s1, s2, s3 and s4 are transmitting messages. The weight of the four sources to destination d, are 10, 20, 30 and 40 respectively. Destination d's maximum receive rate is 100. In this example, assume that the initial rate assigned to the sources is 10, 20, 30, and 40 respectively which is the fair share of the rates when all four agents are active. In the beginning only three agents, s1, s3 and s4 are active. Their initial transmit rates are 10, 30 and 40, however, in this example the agent s4 is transmitting only at rate of 10. Thus the total receive rate at the destination is 50.

In FIG. 6(b), the receive rate computation module at the destination tracks the receive rate from each source, for example, 100–the total receive rate=the leftover bandwidth 603. Once the module realizes that there is leftover bandwidth (603) of 50 in the system, the destination will begin allocating additional bandwidth to the active agents. The agents s1 and s3 are active (600 and 601) while agent s4 is active but slow (602), i.e. it is transmitting less than its fair share. The leftover bandwidth can be divided among the active but not slow agents, which are s1 and s3.

Figure 6C:
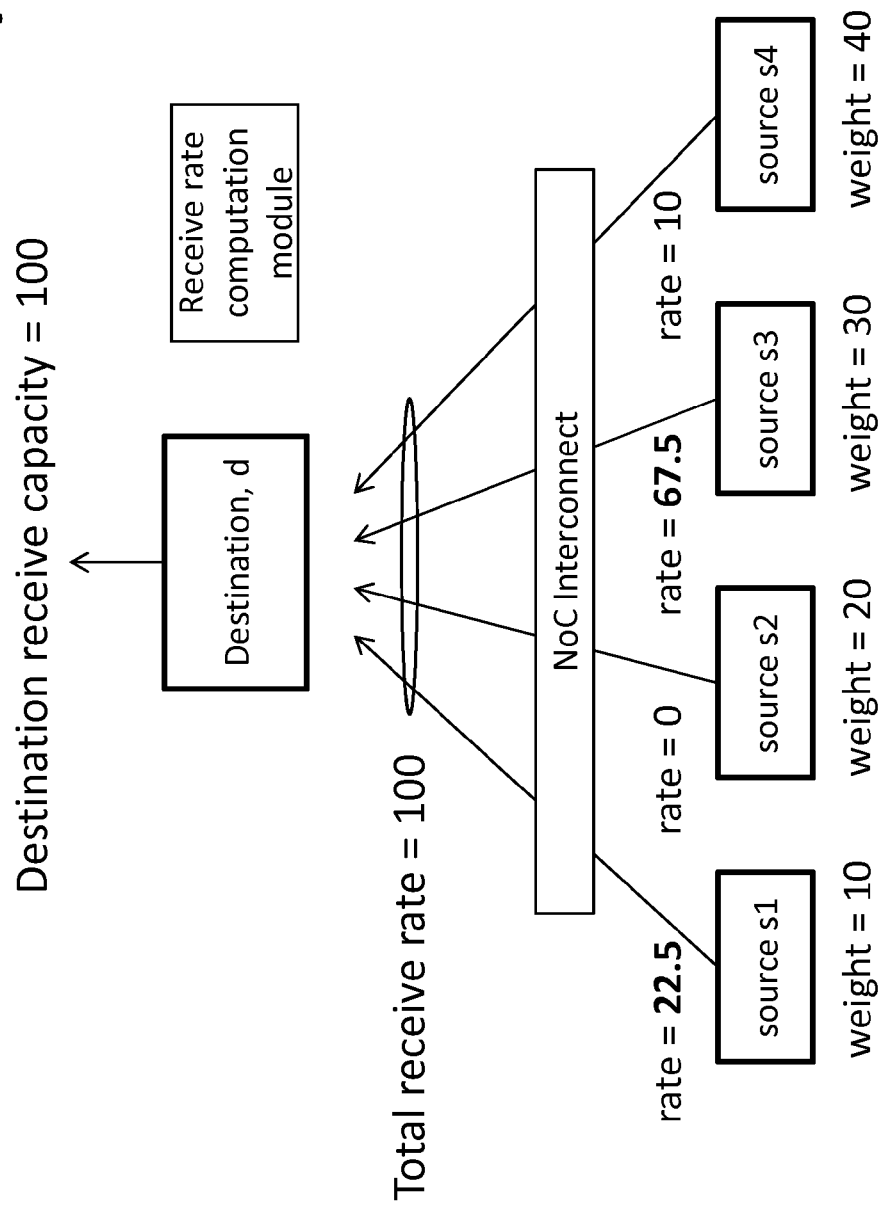
FIG. 6(c) illustrates the system with updated transmission rates after the leftover rates were notified to the source agents and source agents updated their transmission rates, in accordance with an example implementation.

The resulting leftover bandwidth allocation to these two agents is shown in 604. The leftover bandwidth is allocated based on the weight of the two agents. Subsequently, the leftover bandwidth is added to the current transmit rate of the agents and they are notified of the new transmit rates, 22.5 and 67.5 respectively. The resulting state of the system after the source agents s1 and s3 update their transmit rates is shown in FIG. 6(c).

In this example, the source agents store the notified rate from the destinations for rate regulation. When there are multiple destinations to which a source agent communicates, then for each destination, the notified rate value is stored and the source ensures that the transmissions rate to each destination meets the rate. A number of alternative designs are possible. An example implementation may use resources or buffers at each destination to accept messages which can be partitioned statically or dynamically based on the source agent's activity and weights.

The destination may notify the sources about the number of available buffers it has for the source and the source agent therefore does not send more messages than the available buffers. The buffer allocation can be made dynamic and the notification of buffer availability may be piggybacked on existing sets of messages in the system. An example implementation may also utilize the source agent's average and peak transmission rates to determine the transmission rate by the source agents to the destination. Another example implementation may use a mechanism where the destination agents send the delta or difference between the expected transmission rate of the source agents and their current transmission rates instead of sending transmission rate values. Using this delta, the sources may adjust their transmission rates. Destinations may continue to send the delta notifications until the system is stabilized and the destinations are no longer congested.

In an alternative example implementation, the notification from destination agents to source agents may only convey to the sources that there is congestion at the destination and optionally by how much, and not the rate at which the sources should transmit or adjust their rates to avoid congestion. In this example, the source agents are responsible for computing the rate at which they may transmit to various destinations. In such a system, the source agents may start with a fixed transmission rate once they becomes active, which can be determined based on the QoS policy. Subsequently when destination agents receive messages, the destination agents notify the active sources about whether the destination is currently congested or not, and optionally the amount of congestion. This notification is broadcasted to all active sources which are currently communicating with the destination. The notification messages may be transmitted whenever the level of congestion at the destination changes, or the set of active agents changes (new agents become active and start talking to the destination, or an active agent stops transmitting to the destination).

When a notification message arrives at a source, the source reacts to the message by updating its transmission rate. If the destination is not congested, then source agents may increase their rates by a fixed value or a fixed multiple of the current transmit rate. They can continue increasing the rates every time they receive a notification that indicates that there is no congestion at the destination. Once a congestion notification message arrives, source agents may thereby reduce their transmission rate. If the level of congestion is not known then the source agents may reduce the transmission rate with a fixed value or a fixed multiple, or the rate reduction can be proportional to the level of congestion at the destination.

In this example where congestion notification only indicates whether there is congestion or not without the actual amount of congestion, there may be oscillations in the congestion level at the destination depending on the source actions. A number of optimizations may be used to avoid the oscillations. For example, the rate at which the transmit rate of various sources are increased may be reduced upon each non-congestion notification to allow smooth convergence to a steady state rate. A standard proportional integral (PI) or proportional integral derivative (PID) controller based mechanism may also be used to adjust the rates. The Proportional gain, Integral gain, and the Derivative gain tuning parameters can be chosen based on the system parameters such as number of agents, burstiness in traffic, etc.

Another concern with such a design may be the unfairness of the destination's bandwidth allocation among various contending source agents. Since the source agents are reacting locally and independently, the final rate at which they stabilize may depend upon when they became active and how many notification messages they have received so far.

To address this, an example implementation may reset the transmit rates of all source agents to various destination agents to the initial configured value periodically and then repeat the notification protocol until the rates stabilize again. Since the notification messages are sent to all source agents, in this round if no new sources were activated during the stabilization period, the resulting rates will be fair.

The frequency at which notification messages are sent may vary in various implementations. In a design where the destination agents respond back with a response message for an arriving message, the notification may be piggybacked on the response and therefore can be sent for every arriving message. When such response messages are not present, or when the notification cannot be piggybacked on the response messages, the notification may be sent less frequently. In an example implementation, the notification message may be sent by the destination agent whenever new agents begin to communicate with the destination, or an active agents stops communicating with the destination. Additionally, the notification message may be sent when the level of congestion at the destination changes that requires the transmission rates at the sources to be updated.

The second method of congestion avoidance and QoS via injection regulation involves computation of the transmission rate by the source agents without any explicit notification from the destinations. To compute the transmission rate, the sources determine the level of congestion at the destinations with which it is communicating. The congestion level may be determined by monitoring for observable metrics such as round-trip time of request messages to response messages, when response messages are expected for the request messages, or the amount of backpressure the source agent is experiencing from the network when the source agent attempts to inject a message for a given destination. The backpressure is the flow control signaling from the network to an agent if the agent is no longer allowed to send any more data into the network due to congestion in the network. Since the network is reliable, when a destination becomes congested, the congestion propagates into the network and finally appears at source agent's interface to the network. Based on the amount of backpressure from the network to an agent (e.g., number of queued messages, etc.) which indicates the congestion level, source agents can take action locally to avoid congestion and also ensure QoS.

Source agents may regulate the transmission rates in a number of ways. In an example implementation where round-trip time from request messages to response messages are used by source agents and is used as metric of congestion, the source agents may use multiple sets of local registers, one for each destination, to track the round-trip latencies and current transmission rates to the destinations. Sources may start transmission at a fixed rate which may be decided based on the QoS policy, relative weight of various traffic flows from sources to the destination agents, and the maximum bandwidth of the destination agents.

If the observed round-trip time to a destination is comparable to the latency in an uncongested system then source agent may decide to increase the transmission rate to the destination. The rate of increase may be linear additive, i.e. after each round-trip time of latency observation the transmission rate is increased by a fixed value as long as round-trip time does not indicate congestion. The fixed value may be determined based on how quickly the source agents want to achieve full bandwidth utilization; choosing a high rate of increase will enable source agents to reach high bandwidth quickly and increase the system utilization, however it may also lead to oscillations in the system congestion.

When congestion occurs in the system, the round-trip time will begin to grow; when source agents observe this, they may back-off and reduce the transmission rates. The rate at which transmission rate is reduced may be multiplicative, i.e. the rate will be reduced by a fixed multiple (new rate=current rate×k, k<1). This method of additive increase but multiplicative decrease may help in avoiding oscillations and ensure better fairness and QoS between various source agents contending for a destination. A standard proportional integral (PI) or proportional integral derivate (PID) controller based mechanism may also be used to adjust the rates based on the observed congestion.

In designs, where round-trip latency may not be used as congestion feedback, the source agents can simply track the backpressure signal at its outgoing interfaces to infer the level of congestion in the system. The more frequently an outgoing interface is experiencing backpressure, the more there is congestion at the set of destinations for the transmitted messages of the interface. As the congestion level is determined at an interface, the transmission rates to the set of corresponding destination agents can be regulated based on the previously described additive increase and multiplicative decrease or PI and PID controller scheme.

In the third method of congestion avoidance and QoS via injection regulation, end to end credit based flow control is used between all source and destination agents. The destination agents use buffers to receive arriving messages and control the message arrival by providing credits to the source agents. A credit corresponds to an empty buffer slot at the destination allocated for a message from the source agent. If a source does not have an allocated buffer or credit for a destination, it cannot send messages to the destination, and must acquire credit first. Buffer allocation and credit distribution to various source agents are performed at each destination agent based on the QoS policy. This method provides end-to-end flow control in the system and congestion avoidance and QoS policy can be ensured with the correct allocation of buffers, distribution of credit and processing of the arriving messages at the destination. Buffers or credits at a destination can be pre-allocated among the source agents communicating with the destination or can be dynamically allocated upon receiving an explicit request from the sources. These two example implementations are described next.

In the first example implementation of end-to-end credit based flow control, every destination agent has separate buffer pools for arriving messages from every source agent. This is illustrated in FIG. 7(a). There are four source agents s1, s2, s3, s4 communicating with a destination agent d. At the destination, there are four buffer pools, one for each source agent. The arriving messages 1, 2, 3, and 4, from the source agents are stored in the corresponding buffer pool in a First in First out order (FIFO). Certain designs may store the arriving messages in non-FIFO order depending on the priority of various messages or certain isolation requirements such as one type of messages cannot block the other types.

Source agents must acquire credit before sending a message to the destination. In this case, since separate buffer pools are available for each source, the sources can begin with a credit value equal to the number of slots in its buffer pool at the destination. Alternatively sources may begin with zero credit, and the destinations distribute credits to the sources after reset based on the number of free slots in the buffer pool. Once a source agent has a credit for the destination d, it can send a message and decrement the credit value. The source agent can continue sending as long as it has positive credit left. At the destination, an arriving message is guaranteed to be accepted eventually as it will always have a buffer slot available for it.

At the destination, the arriving messages stored in the buffers are read (700) and for further processing at the destination agent. The mechanism to read the messages from various buffer pools is based on the system QoS policy. Consider a QoS policy which assigns weights w1, w2, w3 and w4 to the four source agents. In this case if the destination agent is congested, i.e. messages are arriving at rate higher than it can process, then the number of messages read and processed from each buffer can be made proportional to the weight of the source that writes into the buffer. Say the weights of the four buffers are 1, 2, 3 and 4, respectively. In this case, in every 10 messages that are read, one should be from the first buffer, two should be from the second buffer, three should be from the third buffer and four should be from the fourth buffer, providing weighted fair allocation of bandwidth to each source agent.

A slightly approximate implementation may provide fairness over larger periods of time, allowing some unfairness during short time periods. Standard weighted Round Robin (WRR), Deficit Round Robin (DRR), or Weighted Fair Queuing (WFQ) based designs may be used to implement the read mechanism. QoS policy may also provide different priority to the source agents, and the priority may be strict, i.e. if there is a message of higher priority waiting then it has be processed before all messages of lower priority. Between messages of the same priority value, equal or weighted fairness may be needed. In this case, a combination of weighted arbitration and strict priority arbitration may be implemented.

Figure 8B:
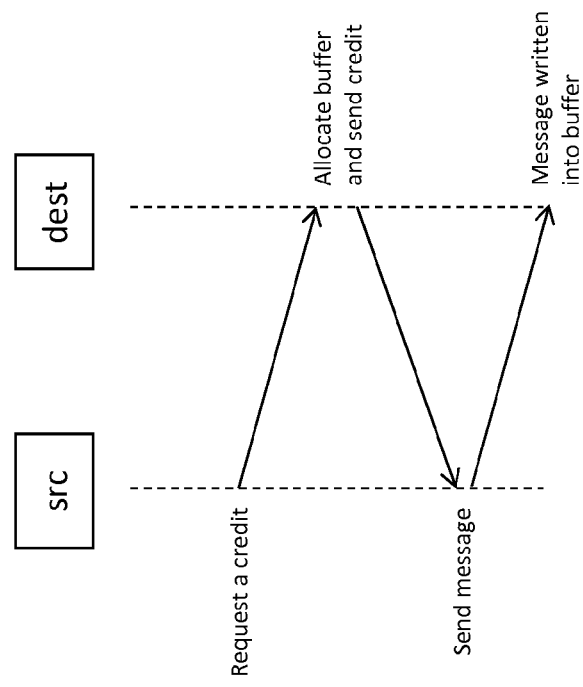
FIG. 8(a), (b), (c) and (d) illustrate the message transmission and credit return protocol in various example implementations.
Figure 8A:
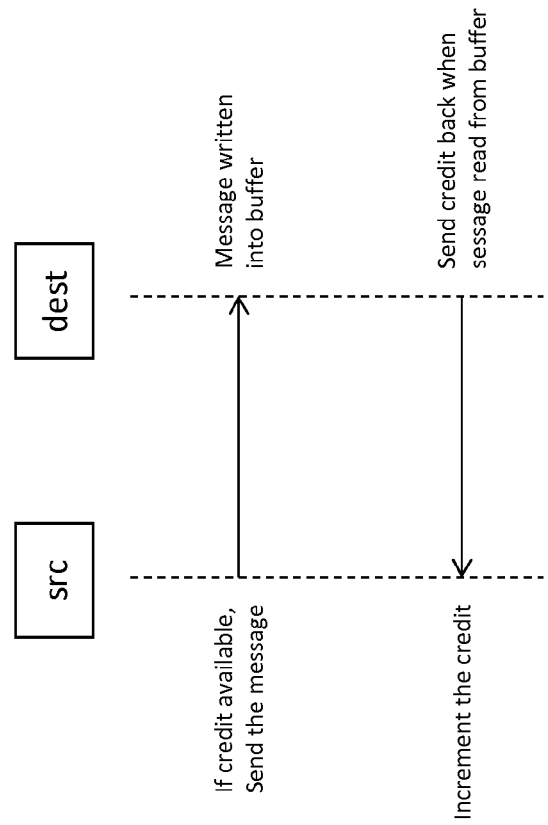

Once a message is read and removed from the buffer, the corresponding source agent can send a new message to the destination. Therefore, the destination agent can send a credit back to the source agents each time a message is read from the buffer. The credit can be sent as a separate message to the source agent, or can be piggybacked on an existing message that is being sent to the source agent. If the arriving message at the destination is going to generate a response message back to the source then it may be efficient to piggyback the credit on the response message. The resulting protocol of message transmission and credit return is illustrated in FIG. 8(a).

In the first example implementation of end-to-end credit based flow control, there is a separate buffer pool for every source agent; therefore the total number of buffers needed at a destination may be proportional to the number of source agents talking to the destination. In a fully connected system where all agents talk to all other agents, the total number of buffers in the entire system may be $O(n^2)$ for n agents, since each destination may need n−1 buffer pools, or one for each source. To maintain high performance, the number of slots in the buffer pool for each source agent may need to be proportional to the round-trip latency between the source and the destination, and the maximum message rate from the source to the destination. If a ring topology interconnect is used, the round-trip latency may be $O(n)$ and therefore the total number of buffer slots in the system may be $O(n^3)$. If a mesh or Torus topology interconnect, the round-trip time may be $O(n^{1/2})$, in which case the total number of buffer slots in the system may be $O(n^{5/2})$. Clearly in this example, the number of buffer slots may grow to become excessive as a fully connected system scales in number of agents.

Figure 7B:
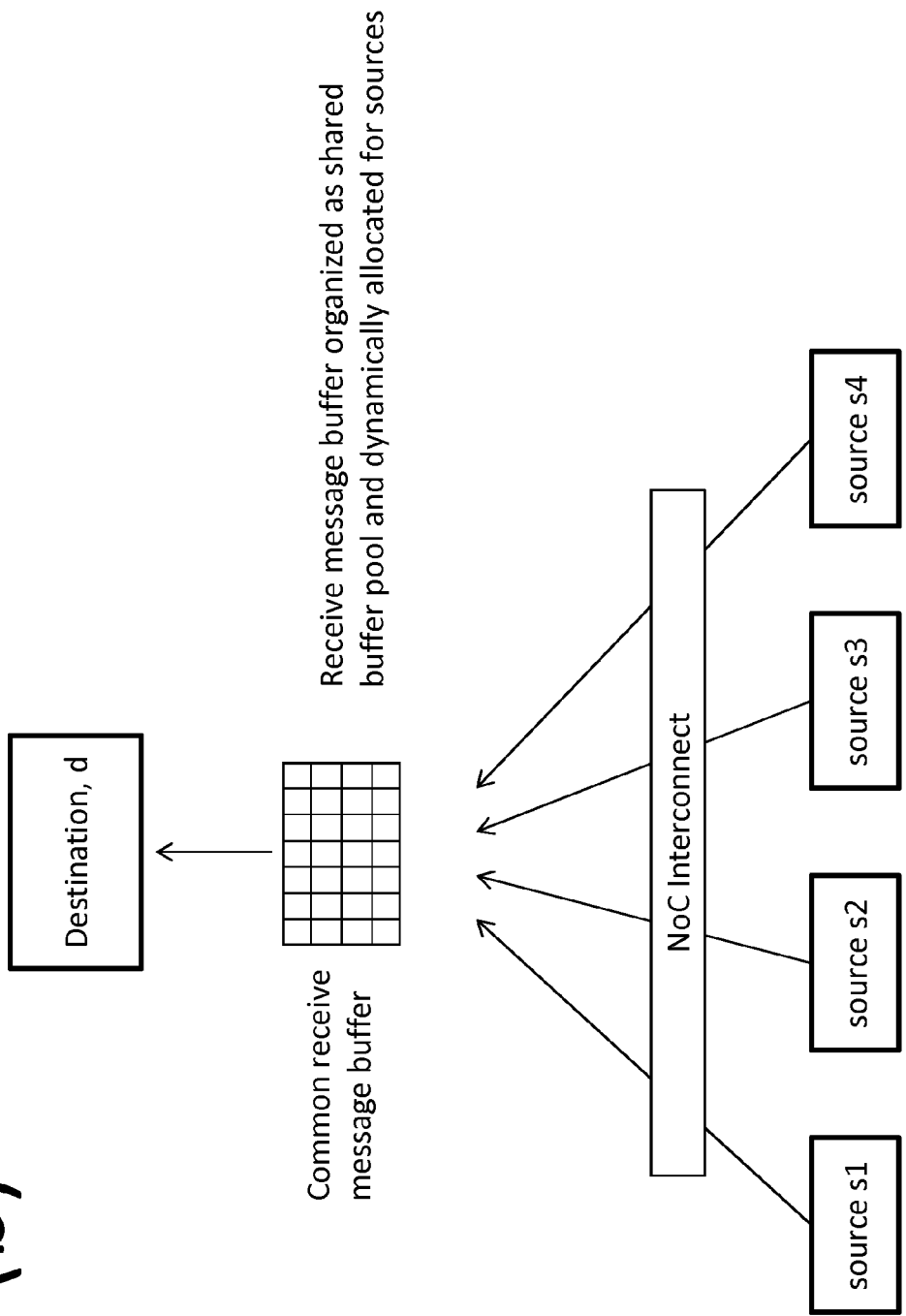
FIG. 7(b) illustrates a system with four source and one destination agents and end-to-end credit based flow control scheme using a shared buffer pool at the destination for all source agents.

To reduce the number of buffer slots, a second example implementation of end-to-end flow control method may use a shared pool of buffers at the destinations to store the arriving messages from various sources instead of separate buffers for each source agent. An example is illustrated in FIG. 7(b). The buffer slots from the shared pool may be dynamically allocated to the requesting source agents based on their need and based on the QoS policy. Thus the source agents begin with no credit. To send a message, source agents send a credit request message to the destination. If destination has a buffer slot available then it reserves the slot for the request and responds back with a credit to the source. Source can then consume the credit and send the message. The resulting protocol of message transmission and credit return is illustrated in FIG. 8(b). To reduce latency, it is possible for sources to acquire a few credits ahead of time. In such designs, there may be deadlock if the destination runs out of buffer slots and new credits, and if sources acquire credits that they are not using. To avoid this, the source agents return the unused credits back to the destination if they are not used after certain timeout interval.

In another example, source agents can go ahead and send a message to the destination without acquiring a credit from the destination. The destination agents may choose to accept an arriving message if there are available resources to accept and process the message or it may decide to discard it. In case the destination discards an arriving message from a source, the destination notifies the source so that the source agent can re-transmit this message. In order to avoid multiple retransmissions and discards of the same message, an example implementation may restrain the sources to always acquire a credit before re-sending a message that was earlier discarded by the destination.

Figure 8C:
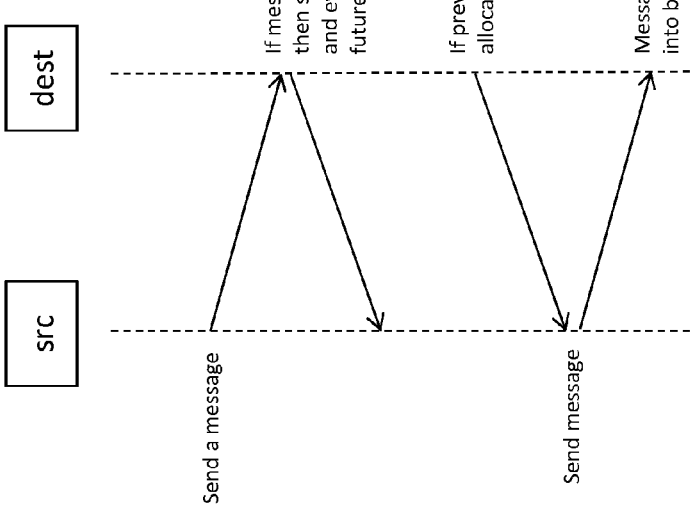
Figure 8D:
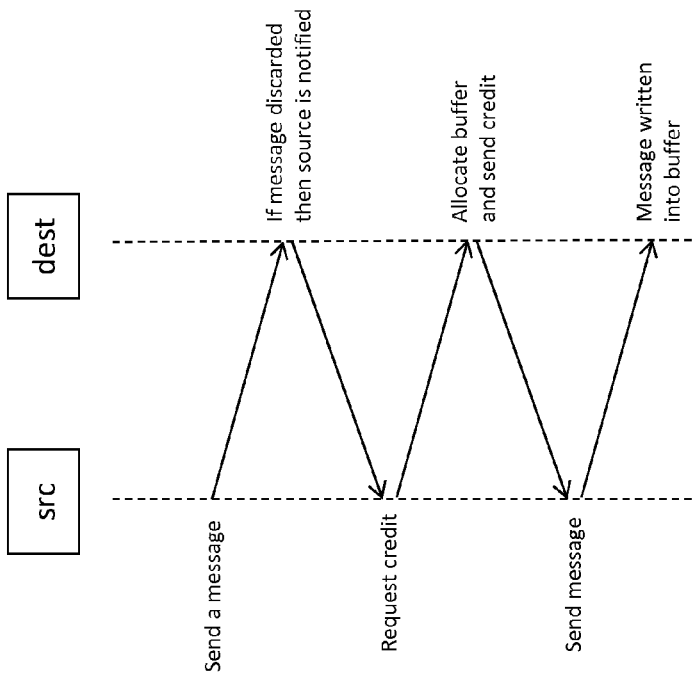

The resulting protocol of message transmission and credit return is illustrated in FIG. 8(c). An additional optimization may avoid a source from sending an explicit credit request to a destination for a previously discarded message. Assuming that source agents always resends the discarded messages later, the destination can register all discards and send credits to the requesting source agents later once resources and buffer slots are available at the destination for the source. Once the credit arrives at the source the source agent may re-send the discarded messages which are guaranteed to be accepted at the destination this time. The resulting protocol of message transmission and credit return is illustrated in FIG. 8(d).

Re-transmission of messages may affect the ordering of message delivery so the source and destination agents should ensure that the un-ordered delivery of message is either acceptable or is resolved correctly.

When arriving messages are processed by the destination, the buffer slot is freed up, and can be used for a newly arriving message or can be allocated for a source agent that requested a credit previously or had a message discarded.

A hybrid implementation of the two end-to-end flow control schemes may use both, a set of separate buffer pools for each source agent and a set of dynamically allocated shared buffer pool to be shared among all sources. In this case, the source agents will track two types of credits for each destination, one for the dedicated buffer pool it has for itself at the destination, and the other for the buffer slots it requests and allocates dynamically at the destination. The source agents, based on its design, the types of messages it is sending, and the QoS policy, may use the two types of credits for the different types of messages being sent.

A number of alternative example implementations are possible within the context of the previously described end-to-end flow control schemes, in which the buffer allocation and credit distribution at the destination may be performed in various ways depending upon the latency between the destination and source agents, the topology of the NoC interconnect, the bandwidth of various NoC channels and the transmission and receive capability of the agents. One may also combine the end-to-end credit flow control schemes with the feedback based congestion notification schemes to avoid congestion more effectively and provide end-to-end QoS more efficiently.

Figure 9:
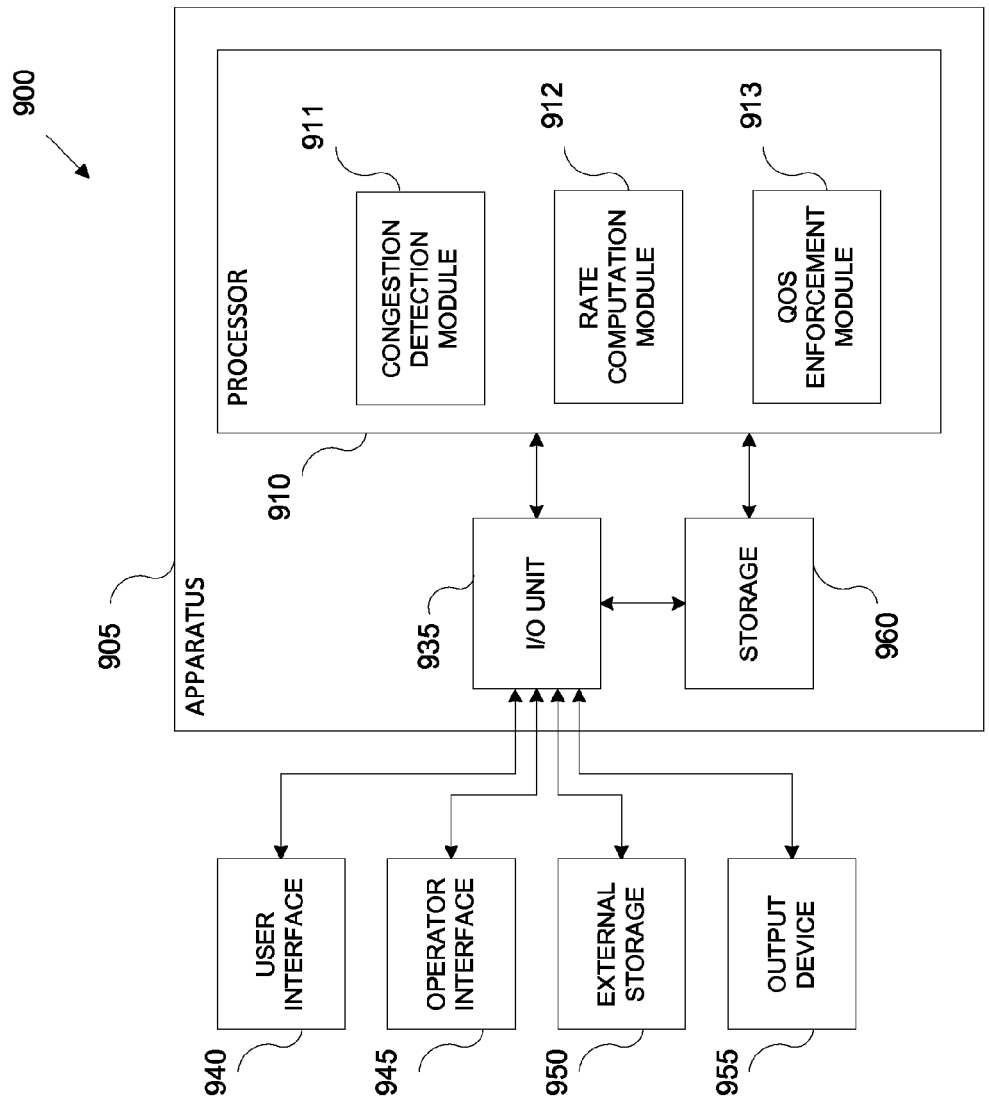
FIG. 9 illustrates a computer/apparatus block diagram upon which the example implementations described herein may be implemented.

FIG. 9 illustrates an example computer system 900 on which example designs may be implemented. The computer system 900 includes an apparatus 905 which may involve an I/O unit 935, storage 960, and a processor 910 operable to execute one or more units as known to one of skill in the art. The term "computer-readable medium" as used herein refers to any medium that participates in providing instructions to processor 910 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 940 and operator interfaces 945 which may utilize input devices such as a keyboard, mouse, touch device, or verbal command.

The apparatus 905 may also be connected to an external storage 950, which can contain removable storage such as a portable hard drive, optical media (CD or DVD), disk media or any other medium from which a computer can read executable code. The apparatus may also be connected an output device 955, such as a display to output data and other information to a user, as well as request additional information from a user. The connections from the apparatus 905 to the user interface 940, the operator interface 945, the external storage 950, and the output device 955 may via wireless protocols, such as the 902.11 standards, Bluetooth® or cellular protocols, or via physical transmission media, such as cables or fiber optics. The output device 955 may therefore further act as an input device for interacting with a user.

The processor 910 may execute one or more modules. The congestion detection module 911 may be configured to determine the congestion level in the network based on various performance metrics such as the round trip latency or the amount of backpressure observed by the source agents, or, the receive rate of messages at a destination agent. The rate computation module 912 present at a NoC node may compute the rate at which an agent may transmit data into network. Source agents may compute the rates by observing the congestion level metrics such as round trip time or amount of backpressure, or destination agents may compute the rate at which various sources may send to it based on the rate at which it is receiving messages currently and the rate at which it can process them. The QoS enforcement module 913 may be configured to dynamically adjust the transmission rates at various source agents so that the end-to-end QoS specification is satisfied.

The various modules and processor, in single or in combination be configured to perform certain operations. Such operations can include to receive, at one of a first node and a second node in the NoC, an instruction based on at least one of a command signal from the other of the first node and the second node, a computed level of congestion based on a QoS metric indicative of traffic congestion, and an end-to-end flow control buffer allocation result; and to determine, at the one of the first node and the second node, an allocation of traffic bandwidth based on a result of the instruction. As described above, the QoS metric can include at least one of a round trip time of a request message to a response message, and backpressure experienced by the one of the first node and the second node. The command signal can be in the form of a bit signal and/or a notification message indicative of congestion. Further operations can include to determine an allocation of traffic bandwidth by a computation of a transmission rate at the one of the first node and the second node and an allocation of the traffic bandwidth based on the computed transmission rate, and/or by an issuance of a buffer allocation to the one of the first node and the second node from the other of the first node and the second node based on the result of the instruction, as described in the example implementations above.

Figure 10:
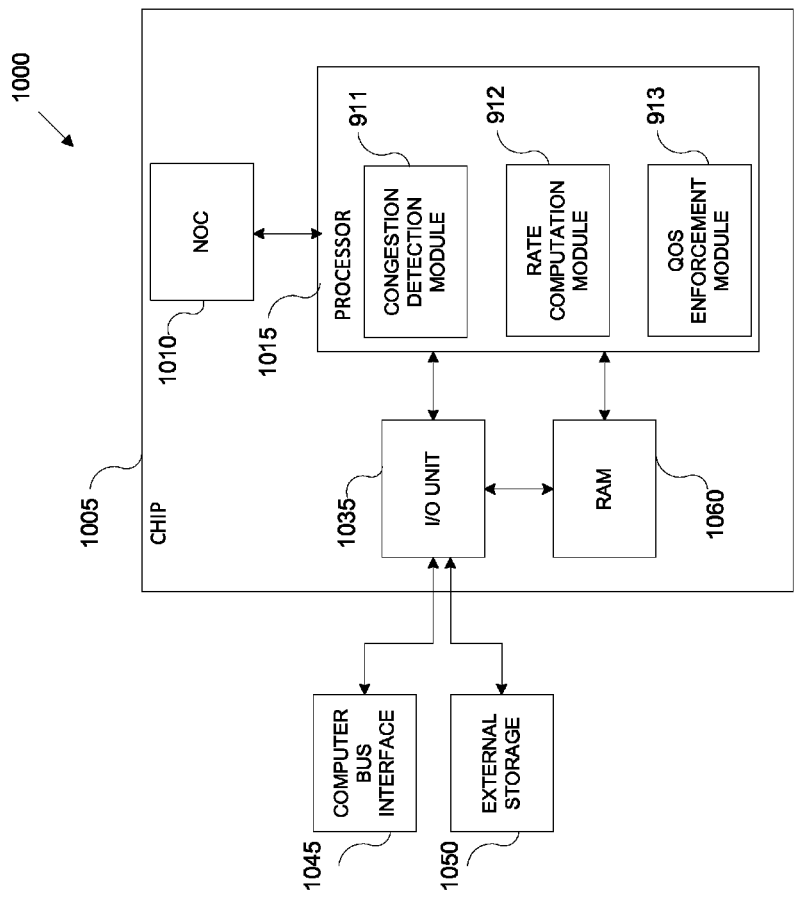
FIG. 10 illustrates an example Network on Chip (NoC) block diagram, on which example implementations may be implemented.

FIG. 10 illustrates an example Network on Chip (NoC) hardware block diagram 1000, on which example implementations may be implemented. The NoC 1010 may include a plurality of routers and hosts that are connected by interconnects, as illustrated and described in FIGS. 1-6. The NoC 1010 can be implemented on a chip 1015, which may be in the form of an integrated circuit, such as a System on Chip (SoC), Very-Large-Scale-Integration (VLSI) device or other hardware configurations, depending on the desired implementation. In an example configuration, the NoC 1010 is configured to handle all of the functions as described in the example implementations above at the NoC level, or can be operated on with a processor.

Chip 1015 may also include an I/O unit 1035 for facilitating communications between the chip 1015 and a computer system implementing the chip 1015 via a computer bus interface 1045 and external storage 1050. Chip 1015 may also include Random Access Memory (RAM) 1060 and processor 1015. Processor 1015 may store and execute the congestion detection module 911, the rate computation module 912, and the QoS enforcement module 913 as described above. Additionally, the modules in the processor 1015 can be stored and executed within the nodes of the NoC 1010 itself at the NoC level.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A Network on Chip (NoC) comprising a first node and a second node, the NoC configured to:
receive, at one of the first node and the second node, an instruction based on a command signal from the other of the first node and the second node, and a computed level of congestion based on a Quality of Service (QoS) metric indicative of traffic congestion, the computed level of congestion is computed at the other of the first node and the second node, and
wherein the one of the first node and the second node adjusts, based on the instruction, an allocation of traffic bandwidth of the one of the first node and the second node,
wherein the one of the first node and the second node is a source agent configured to generate a message for a destination agent and transmit the message to a router of the NoC, and the other of the first node and the second node is the destination agent of the message;
wherein the one of the first node and the second node adjusts the allocation of traffic bandwidth based on a buffer allocation issued to the one of the first node and the second node from the other of first node and the second node.

2. The NoC of claim 1, wherein the QoS metric comprises at least one of a round trip time of a request message to a response message, and backpressure experienced by the one of the first node and the second node.

3. The NoC of claim 1, wherein the command signal is a notification message indicative of a degree of congestion.

4. The NoC of claim 1, wherein the one of the first node and the second node adjusts, for itself, the allocation of traffic bandwidth by a determination of a transmission rate at the one of the first node and the second node and an allocation of traffic bandwidth based on the determined transmission rate.

5. A method for a Network on Chip (NoC) comprising a first node and a second node, the method comprising:
receiving, at one of the first node and the second node, an instruction based on a command signal from the other of the first node and the second node, and a computed level of congestion based on a Quality of Service (QoS) metric indicative of traffic congestion, the computed level of congestion is computed at the other of the first node and the second node, and
wherein the one of the first node and the second node adjusts, based on the instruction, an allocation of traffic bandwidth of the one of the first node and the second node,
wherein the one of the first node and the second node is a source agent configured to generate a message for a destination agent and transmit the message to a router of the NoC, and the other of the first node and the second node is the destination agent of the message;
wherein the one of the first node and the second node adjusts the allocation of traffic bandwidth based on a buffer allocation issued to the one of the first node and the second node from the other of first node and the second node.

6. The method of claim 5, wherein the QoS metric comprises at least one of a round trip time of a request message to a response message, and backpressure experienced by the one of the first node and the second node.

7. The method of claim 5, wherein the command signal is a notification message indicative of a degree of congestion.

8. The method of claim 5, wherein the one of the first node and the second node adjusts, for itself, the allocation of traffic bandwidth by a determination of a transmission rate at the one of the first node and the second node and an allocation of traffic bandwidth based on the determined transmission rate.

9. A non-transitory computer readable medium, storing instructions for executing a process for a Network on Chip (NoC) comprising a first node and a second node, the instructions comprising:

receiving, at one of the first node and the second node, an instruction based on a command signal from the other of the first node and the second node, and a computed level of congestion based on a Quality of Service (QoS) metric indicative of traffic congestion, the computed level of congestion is computed at the other of the first node and the second node, and wherein the one of the first node and the second node adjusts, based on the instruction, an allocation of traffic bandwidth of the one of the first node and the second node, wherein the one of the first node and the second node is a source agent configured to generate a message for a destination agent and transmit the message to a router of the NoC, and the other of the first node and the second node is the destination agent of the message;

wherein the one of the first node and the second node adjusts the allocation of traffic bandwidth based on a buffer allocation issued to the one of the first node and the second node from the other of first node and the second node.

10. The non-transitory computer readable medium of claim 9, wherein the QoS metric comprises at least one of a round trip time of a request message to a response message, and backpressure experienced by the one of the first node and the second node.

11. The non-transitory computer readable medium of claim 9, wherein the command signal is a notification message indicative of a degree of congestion.

12. The non-transitory computer readable medium of claim 9, wherein the one of the first node and the second node adjusts, for itself, the allocation of traffic bandwidth by a determination of a transmission rate at the one of the first node and the second node and an allocation of traffic bandwidth based on the determined transmission rate.

* * * * *